H. JACOB.
DISTANCE MEASURING INSTRUMENT.
APPLICATION FILED MAR. 24, 1913.
1,160,614.
Patented Nov. 16, 1915.
2 SHEETS—SHEET 1.
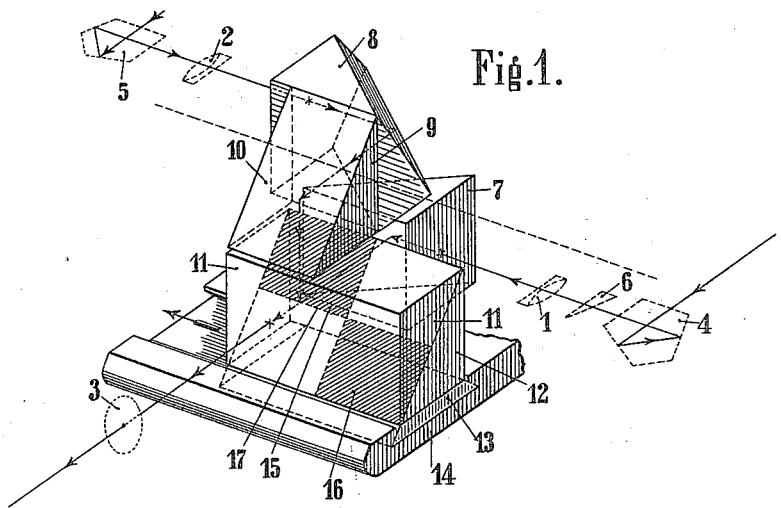

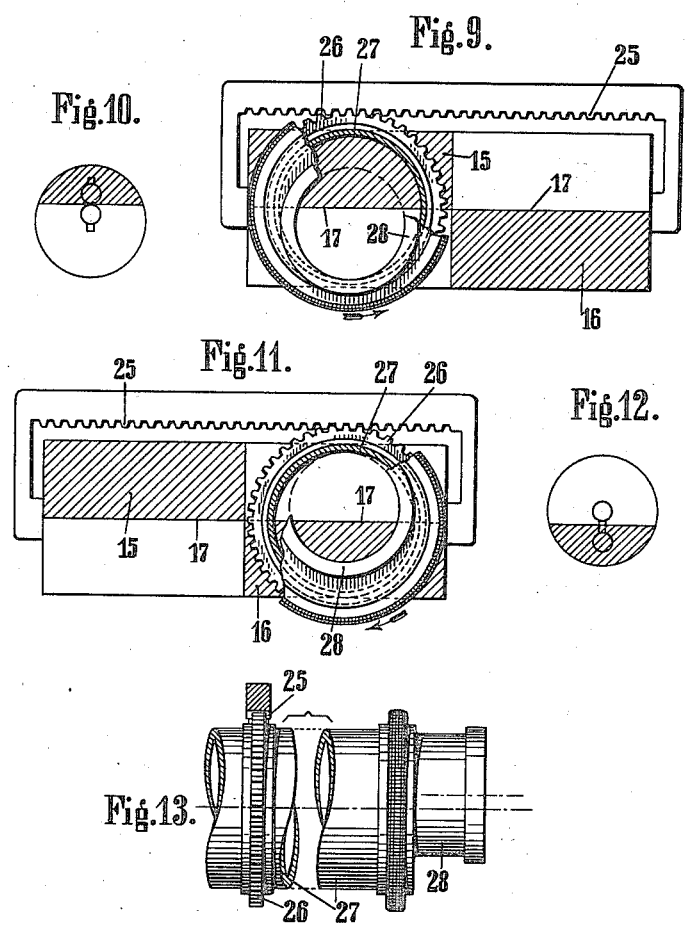

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

DISTANCE-MEASURING INSTRUMENT.

1,160,614.      Specification of Letters Patent.      Patented Nov. 16, 1915.

Application filed March 24, 1913. Serial No. 756,423.

*To all whom it may concern:*

Be it known that I, HEINRICH JACOB, a citizen of the German Empire, and resident of Steglitz, near Berlin, Germany, have invented certain new and useful Improvements in Distance-Measuring Instruments, of which the following is a specification.

This invention consists in an improvement in, or modification of a distance measuring instrument of the coincident image type described in the specification of United States Patent No. 1,038,831. The base line telemeter described and illustrated in the said patent is provided with an ocular prism device having reflecting surfaces arranged partially on the one and partially on the other side of a straight edge transversing the field of view of the instrument. With this device, either the bases or the tops of the two images may be made to coincide, and for the purpose of translation from one image position to the other, it is necessary to turn the whole instrument, which is not only inconvenient but is also liable to cause mistakes. Moreover, the instrument has the disadvantage that the effective field of view is smaller than the total field of view of the instrument, since only that part of the field can be used which lies on one side of the dividing line.

According to my present invention I obviate these defects by making the ocular prism body movable so that its reflective surfaces disposed on opposite sides of the dividing line can be displaced in their own planes. This enables the whole field of view of the instrument to be utilized for all kinds of observation, and renders turning of the instrument unnecessary.

The accompanying drawings show several forms of construction embodying this invention.

Figure 1 is a diagram of the optical system of a distance measuring instrument according to the invention. Fig. 2 is a view of reflector surfaces provided in the system in the plane intersecting the ocular image plane. Figs. 3 and 4 represent fields of view of the instrument when it is trained on a balloon, these views showing the two alternative positions of the images. Fig. 5 shows another arrangement of the reflective surface in the plane intersecting the image plane of the ocular, whereby, in a similar manner to Fig. 2, the borders of the field of view being indicated by dotted circles, as in Fig. 2. Figs. 6, 7 and 8 show two arrangements of ocular prisms for distance measuring instruments with which the object is viewed at an angle. Figs. 9 to 13 show mechanism for moving the reflector surfaces of the ocular prism and simultaneously displacing the dividing line in the field of view.

In the optical system shown in Fig. 1, the two objectives of the instrument are designated by 1, 2; 3 being the ocular. Penta prisms 4 or 5 are mounted in front of the objectives in the known manner. 6 designates a movable wedge like prism and pointer, by adjustment of which the images of distance objects appearing on opposite sides of the dividing line in the field of view are brought into coincidence with each other, the position of the pointer 6 indicating the distance of the objects whereof the images coincide. 7 and 8 are prisms which deflect the rays from the objectives 1, 2 toward the ocular 3. 9 is a fixed prism which receives the rays passing from the objective 2 through the prism 8. 10 designates a reflective surface of this prism, by which the rays entering the prism are reflected to a prism body 11 cemented to a prism body 12. The prism body 12 is fixed to a movable slide 13, which is guided in a fixed carrier 14. At the cemented surface of the compound prism 11, 12 there are two mirrors 15, 16, the edges of which form the dividing line 17 in the image plane of the ocular 3. The cement surface between the prisms 11, 12, which are provided with the reflective surfaces or mirrors 15, 16, intersects the image plane of the ocular at the line 17. The path of the axial rays is shown in Fig. 1. It will be seen that with the compound prisms 11, 12 adjusted so that the mirror 15 is in use, the rays coming from a distant object and passing through the objective 2 enter the field of view of the ocular in such manner that the image which appears above the dividing line 17 shows the observed object in an upright position, whereas the image below the dividing line is inverted, as shown in Fig. 3. If however, the compound prism 11, 12 is moved with its carrier 13 in the guide 14 in such manner that the mirror 16 comes into use, the images of the object observed appear as shown in Fig. 4.

The arrangement of the reflective surfaces in the plane intersecting the image plane of the ocular may be modified in various ways. For instance, the reflector surfaces may be narrow strips, as shown in Fig. 5, these strips being either contiguous or separated from each other. If as is preferable, the place of coincidence of the images in the field of view is always at the same height, the edges of the reflector surfaces which form the dividing line must lie on a straight line, as is the case with the arrangements according to Figs. 2 and 5.

The arrangement described may be used with ocular prisms of any shape.

The ocular prism system shown in Figs. 6 and 7, for a distance measuring instrument having an angular line of vision, is the equivalent of the prisms 7, 8, 9, 11, 12 in Fig. 1, and comprises two prisms 18, 19 for deflecting the rays toward the ocular, and a movable prism body 20 which comprises two parts cemented together. At the cemented surface are two mirror surfaces 21, 22, the edges 23 of which form the dividing line in the image field. By displacing the prism body 20 with relation to the prisms 18, 19 either the mirror 21 or the mirror 22 can be brought into use. The path of the rays is shown in Fig. 6. The arrangement shown in Fig. 8 is substantially similar to that shown in Fig. 7, with the exception that the prism system which has the mirror surfaces 21, 22 at the cemented surface is divided into two parts, at 24, so that the part with the reflective surfaces is movable in relation to the other part.

The mechanism shown in Figs. 9 to 13, for changing the position of the reflective surfaces in the field of view of the instrument comprises means whereby the dividing line is simultaneously moved in the image field in such manner that with both adjustments the line dividing the field into two unequal sections, is placed so that the upright image appears in the larger field section, the inverted image appearing in the smaller field section. This arrangement is advantageous in that it provides a large field for orientation.

The carrier of the reflective surfaces in the ocular prism body which are designated 15, 16 as in Figs. 1 and 2, is provided with a rack 25 engaged with a toothed ring or flange 26 on the ocular tube 27. The holder 28 of the ocular is eccentrically fixed to the ocular tube 27. By turning the ocular tube 27 the carrier of the reflecting surfaces 15 and 16 is moved and the position of the holder 28 is simultaneously shifted with respect to the border line 17 of the reflective surfaces 15, 16, as shown in Figs. 9 and 11. This displacement of the ocular holder 28 is equivalent to a displacement of the dividing line in the image field, so that the field of view either appears as shown in Fig. 10 or as shown in Fig. 12, according to whether the reflecting surface 15 or the surface 16 is used.

What I claim is:

1. In a base line telemeter an ocular prism device provided with an element-carrying reflecting surfaces, means for shifting said element so as to displace a reflecting surface provided thereon in its own plane.

2. In a base line telemeter an ocular prism device having a movable element provided with reflecting layers in a plane surface said reflecting layers having straight limiting edges adapted to form image dividing lines within the field of view, the reflecting layers arranged partially on the one and partially on the other side of their image dividing lines forming limiting edges, and the movable element-carrying reflecting layers adapted to be displaced so as to bring at will a reflecting layer positioned on one side of an image dividing line into operative position or a reflecting layer positioned on the other side.

3. In a base line telemeter an ocular, and an ocular prism device having a movable element carrying plane reflecting surfaces with straight limiting edges, means for connecting said ocular and said movable element, the reflecting surfaces being so arranged on said movable element that on displacing same, either one reflecting surface or the other can be brought in front of the ocular, the straight limiting edges of the reflecting surfaces forming in such operative position image dividing lines in the field of view, the surfaces being positioned on opposite sides of the limiting edges.

4. In a base line telemeter an ocular, a rotatable carrier for same having its axis of rotation arranged parallelly but eccentrically to the optical axis of the ocular, an ocular prism device having an element carrying reflecting surfaces with straight limiting edges, the edges adapted to form image dividing lines within the field of view and the reflecting surfaces positioned on opposite sides of the limiting edges, the carrier of the reflecting surfaces being movable in the direction of the limiting edges of the reflecting surfaces and so interconnected with the rotatable ocular carrier that on rotating the latter the reflecting surface carrier is shifted and the ocular is displaced transversely to the direction of shifting the ocular prism element in such a way that in different operative positions of the prism element the image field sections of greater area are positioned on opposite sides of the image dividing line within the field of view.

In testimony whereof I have signed this specification in the presence of two subscribing witnesses.

HEINRICH JACOB.

Witnesses:
HENRY HASPER,
WOLDEMAR HAUPT.